US009978334B2

(12) United States Patent
Guo et al.

(10) Patent No.: US 9,978,334 B2
(45) Date of Patent: May 22, 2018

(54) DRIVING METHOD OF A LIQUID CRYSTAL DISPLAY PANEL AND LIQUID CRYSTAL DISPLAY DEVICE

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Chunpeng Guo, Guangdong (CN); Jiehui Qin, Guangdong (CN); Xiaoping Tan, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 103 days.

(21) Appl. No.: 14/907,524

(22) PCT Filed: Sep. 9, 2015

(86) PCT No.: PCT/CN2015/089272
§ 371 (c)(1),
(2) Date: Jan. 25, 2016

(87) PCT Pub. No.: WO2017/035854
PCT Pub. Date: Mar. 9, 2017

(65) Prior Publication Data
US 2017/0236487 A1 Aug. 17, 2017

(30) Foreign Application Priority Data
Aug. 28, 2015 (CN) .......................... 2015 1 0541803

(51) Int. Cl.
*G06F 3/038* (2013.01)
*G09G 5/00* (2006.01)
(Continued)

(52) U.S. Cl.
CPC ......... *G09G 3/3696* (2013.01); *G09G 3/2074* (2013.01); *G09G 3/3677* (2013.01);
(Continued)

(58) Field of Classification Search
CPC .. G09G 3/3696; G09G 3/3677; G09G 3/3688; G09G 3/2074; G09G 2320/0666;
(Continued)

(56) References Cited

U.S. PATENT DOCUMENTS 6,266,039 B1 7/2001 Aoki
2003/0151564 A1 8/2003 Yamashita et al.
(Continued)

FOREIGN PATENT DOCUMENTS

CN 1311502 A 9/2001
CN 1576973 A 2/2005
(Continued)

*Primary Examiner* — Ilana Spar
*Assistant Examiner* — Brent D Castiaux
(74) *Attorney, Agent, or Firm* — Andrew C. Cheng

(57) ABSTRACT

A present disclosure provides a driving method for a liquid crystal display panel having steps of: the control chip simultaneously outputs a first selecting signal on a first voltage level, a second selecting signal on the first voltage level and a third selecting signal on the first voltage level to control the first transistors, the second transistors and the third transistors connecting between the buffers and each pixel column to be turned on; the buffers output a pre-charge signal to charge the sub-pixel units in each pixel column to the pre-charge voltage. Further, the present disclosure also provides a liquid crystal display device. The driving method
(Continued)

for a liquid crystal display panel is effectively reduces the power consumption of the liquid crystal display device.

13 Claims, 6 Drawing Sheets

(51) Int. Cl.
*G09G 3/36* (2006.01)
*G09G 3/20* (2006.01)

(52) U.S. Cl.
CPC ... *G09G 3/3688* (2013.01); *G09G 2300/0809* (2013.01); *G09G 2310/0251* (2013.01); *G09G 2310/0291* (2013.01); *G09G 2320/0646* (2013.01); *G09G 2320/0666* (2013.01)

(58) Field of Classification Search
CPC ... G09G 2320/0646; G09G 2300/0809; G09G 2310/0251; G09G 2310/0291
See application file for complete search history.

(56) References Cited

U.S. PATENT DOCUMENTS

| | | | | |
|---|---|---|---|---|
| 2004/0223006 | A1* | 11/2004 | Nakayama | G09G 3/3648 345/690 |
| 2005/0041488 | A1* | 2/2005 | Ito | G11C 5/063 365/199 |
| 2005/0088387 | A1* | 4/2005 | Yokoyama | G09G 3/3648 345/87 |
| 2006/0227628 | A1 | 10/2006 | Eriguchi et al. | |
| 2012/0133631 | A1 | 5/2012 | Lim et al. | |
| 2012/0229525 | A1* | 9/2012 | Nakai | G09G 3/3614 345/690 |
| 2015/0009202 | A1* | 1/2015 | Cho | G09G 3/3696 345/212 |

FOREIGN PATENT DOCUMENTS

| | | | |
|---|---|---|---|
| CN | 1598917 | A | 3/2005 |
| CN | 101055705 | A | 10/2007 |
| CN | 101059941 | A | 10/2007 |
| CN | 101149550 | A | 3/2008 |
| CN | 101452676 | A | 6/2009 |
| CN | 101847379 | A | 9/2010 |
| CN | 102081913 | A | 6/2011 |
| CN | 102354478 | A | 2/2012 |
| CN | 103106862 | A | 5/2013 |
| CN | 103531143 | A | 1/2014 |
| CN | 104282253 | A | 1/2015 |
| JP | 2004354758 | A | 12/2004 |
| JP | 2008020573 | A | 1/2008 |

* cited by examiner

DRIVING METHOD OF A LIQUID CRYSTAL DISPLAY PANEL AND LIQUID CRYSTAL DISPLAY DEVICE

CROSS-REFERENCE TO RELATED APPLICATIONS

This application claims the priority of Chinese Patent Application No. 201510541803.2, entitled "Driving method of a liquid crystal display panel and liquid crystal display device", filed on Aug. 28, 2015, the disclosure of which is incorporated herein by reference in its entirety.

FIELD OF THE INVENTION

The present disclosure relates to a liquid crystal display (LCD) filed, especially to a driving method of a LCD panel and a LCD device.

BACKGROUND OF THE INVENTION

Currently, in the thin film transistor (TFT) LCD device, the LCD device is driven by reversing the polarity to prolong the life span of the liquid crystal. In the driving circuit of the LCD panel using the method to reverse the polarity, the control chip needs to control the voltage to the source of each data line to switch frequently between the positive voltage and negative voltage. Thus, the charging difference of the voltage is caused to be larger and is unfavorable to lower the power consumption of the LCD panel.

With reference to FIG. 1, to solve the aforementioned problem, in the conventional LCD device, it is usually to control the gating signals SELR, SELG, SELB as high voltage level when the charging timing starts. Thus, the TFTs corresponding to the electrodes of all of the R, G, B sub-pixels in each row are switched on simultaneously when progressive scanning and the electrodes of each sub-pixel are charged to GND voltage, i.e. 0V. Then the electrical potentials of the electrodes of all of the R, G, B sub-pixels in this row simultaneously become GND voltage. Then the gating signals SELR, SELR, SELB are controlled as high voltage level in sequence to switch on the corresponding TFTs of the R, G, B sub-pixels in sequence so that the electrodes of the sub-pixels are charged the pixel voltages with corresponding polarity one by one.

Therefore, in the driving circuit of the LCD panel using the method to reverse the polarity, the negative pixel voltages are charged to 0V simultaneously, and then are charged one by one to positive pixel voltages so that the charging difference of the voltages is not so large to lower the power consumption of the LCD panel.

However, generally the GND is not the median when switching the positive and negative pixel voltages. For example, assuming the public voltage is 1.2V, and then the positive and negative pixel voltages corresponding to the source voltage with grayscale brightness 128 are respectively 6V and −3.6V. If using the method that first charging the electrodes of each pixel to the GND voltage, the charging difference of the voltages reaches to 6V when charging from the GND voltage to the positive pixel voltage. Then the charging difference of the voltages is still large to cause the charging time to be longer and the power consumption to be larger.

SUMMARY OF THE INVENTION

In view of the aforementioned problem of the prior arts, the present disclosure provides a driving method for an LCD panel. First each sub-pixel unit of the LCD panel is charged to a pre-charge voltage. Then each sub-pixel unit is charged in sequence from the pre-charge voltage to a corresponding pixel voltage to decrease the difference of charging voltage when using the polarity-reversion way to drive the LCD panel. The charging time is reduced and the power consumption of the LCD device is further reduced.

Further, the present disclosure also provides an LCD device implementing the driving method for the LCD panel.

A driving method for a liquid crystal display (LCD) panel, wherein the method comprises steps of:

simultaneously outputting a first selecting signal on a first voltage level, a second selecting signal on the first voltage level and a third selecting signal on the first voltage level by a control chip to control first transistors, second transistors and third transistors connecting between buffers and each pixel column to be turned on;

outputting a pre-charge voltage signal to pre-charge sub-pixel units in each pixel column to the pre-charge voltage by the buffers.

Further, the pre-charge voltage is any voltage value in a predetermined fluctuation range that takes an average value of a positive pixel voltage value and a negative pixel voltage value of the sub-pixel units corresponding to the same gray scale brightness as a central value.

Further, the pre-charge voltage is any voltage value in a predetermined fluctuation range that takes an average value of a positive pixel voltage value and a negative pixel voltage value of the sub-pixel units corresponding to a highest gray scale brightness as a central value.

Further, the pre-charge voltage is average value of the positive pixel voltage value and the negative pixel voltage value of the sub-pixel units corresponding to the highest gray scale brightness.

Further, when the sub-pixel units in each pixel column are all charged to the pre-charge voltage, the method further comprises steps of:

outputting the first selecting signal on the first voltage level, the second selecting signal on a second voltage level and the third selecting signal on the second voltage level by the control chip to control the first transistors to be turned on, and to control the second transistors and the third transistors to be turned off, and outputting a data signal for driving red sub-pixel units by the buffers to charge the red sub-pixel units from the pre-charge voltage to a corresponding pixel voltage.

Further, when the red sub-pixel units are charged to the corresponding pixel voltage, the method further comprises steps of:

outputting the first selecting signal on the second voltage level, the second selecting signal on the first voltage level and the third selecting signal on the second voltage level by the control chip to control the second transistors to be turned on, and to control the first transistors and the third transistors to be turned off, and outputting a data signal for driving green sub-pixel units by the buffers to charge the green sub-pixel units from the pre-charge voltage to a corresponding pixel voltage.

Further, when the green sub-pixel units are charged to the corresponding pixel voltage, the method further comprises steps of:

outputting the first selecting signal on the second voltage level, the second selecting signal on the second voltage level and the third selecting signal on the first voltage level by the control chip to control the third transistors to be turned on, and to control the first transistors and the second transistors to be turned off, and outputting a data signal for driving blue sub-pixel units by the buffers to charge the blue sub-pixel units from the pre-charge voltage to a corresponding pixel voltage.

An LCD device, wherein the LCD device comprises an LCD panel and a driving circuit for driving the LCD panel; the LCD device comprises multiple pixel columns; each pixel column comprises multiple sub-pixel units; the driving circuit comprises a control chip, multiple buffers and multiple selecting circuits; the control chip is used to output a first selecting signal, a second selecting signal and a third selecting signal; the buffers are used to output a pre-charge voltage signal; each selecting circuit has a first transistor, a second transistor and a third transistor; each buffer connects to the sub-pixel units in the pixel column through the first transistor, the second transistor and the third transistor; the control chip controls the first transistors, the second transistors and the third transistors to be turned on by the first selecting signal, the second selecting signal and the third selecting signal to charge all of the sub-pixel units in each pixel column to a pre-charge voltage by the pre-charge signal outputted by the buffers.

Further, the pre-charge voltage is any voltage value in a predetermined fluctuation range that takes an average value of a positive pixel voltage value and a negative pixel voltage value of the sub-pixel units corresponding to the same gray scale brightness as a central value.

Further, the pre-charge voltage is any voltage value in a predetermined fluctuation range that takes an average value of a positive pixel voltage value and a negative pixel voltage value of the sub-pixel units corresponding to a highest gray scale brightness as a central value.

Further, the pre-charge voltage is average value of the positive pixel voltage value and the negative pixel voltage value of the sub-pixel units corresponding to the highest gray scale brightness.

Further, each pixel column comprises multiple pixel units arranged in a column; each pixel unit comprises a red sub-pixel unit, a green sub-pixel unit and a blue sub-pixel unit; the red sub-pixel unit, the green sub-pixel unit and the blue sub-pixel unit are arranged in a row; the first transistor connecting between a corresponding buffer and the red sub-pixel units in one column; the second transistor connects between a corresponding buffer and the green sub-pixel units in one column; the third transistor connects between a corresponding buffer and the blue sub-pixel units in one column.

Further, the control chip has a first terminal, a second terminal and a third terminal; the first terminal is used to output the first selecting signal; the second terminal is used to output the second selecting signal; the third terminal is used to output the third selecting signal; each transistor has a gate, a source and a drain; the first terminal is connected to the gate of each first transistor; the second terminal is connected to the gate of each second transistor; the third terminal is connected to the gate of each third transistor.

Further, the buffers are also used to buffer data signals; each buffer has an output terminal; the output terminal of each buffer is connected to the sources of the first transistor, the second transistor and the third transistor of each corresponding selecting circuit; the drains of the first transistor, the second transistor and the third transistor of each selecting circuit are connected to the sub-pixel units in each column of each corresponding pixel column.

Further, the first selecting signal, the second selecting signal and the third selecting signal are composed by a first voltage level and a second voltage level; when the first selecting signal is on the first voltage level, the second selecting signal and the third selecting signal are on the second voltage level, the first transistors are turned on and the second transistors and the third transistors are turned off; the data signal buffering in the buffers is transmitted to the red sub-pixel units in one column through the first transistors to charge the red sub-pixel units from the pre-charge voltage to a corresponding pixel voltage.

Further, when the second selecting signal is on the first voltage level, the first selecting signal and the third selecting signal are on the second voltage level, the second transistors are turned on and the first transistors and the third transistors are turned off; the data signal buffering in the buffers is transmitted to the green sub-pixel units in one column through the second transistors to charge the green sub-pixel units from the pre-charge voltage to a corresponding pixel voltage.

Further, when the third selecting signal is on the first voltage level, the first selecting signal and the second selecting signal are on the second voltage level, the third transistors are turned on and the first transistors and the second transistors are turned off; the data signal buffering in the buffers is transmitted to the blue sub-pixel units in one column through the third transistors to charge the blue sub-pixel units from the pre-charge voltage to a corresponding pixel voltage.

The driving method for the LCD panel having steps of: first controlling the first transistors, the second transistors and the third transistors to be turned on simultaneously to charge all of the sub-pixel units to the pre-charge voltage. Thus, when the LCD panel switches the frame of images, the largest difference of voltage of the pixel units in the adjacent pixel columns during the polarity-reversion is decreased to reduce the charging time for the sub-pixel units when the LCD panel switches the frame of images. Thus, the power consumption of the LCD device is reduced.

BRIEF DESCRIPTION OF THE DRAWINGS

In order to more clearly illustrate the embodiments of the present disclosure or prior art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF THE PREFERRED EMBODIMENTS

Embodiments of the present disclosure are described in detail with the technical matters, structural features, achieved objects, and effects with reference to the accompanying drawings as follows. It is clear that the described embodiments are part of embodiments of the present disclosure, but not all embodiments. Based on the embodiments of the present disclosure, all other embodiments to those of ordinary skill in the premise of no creative efforts obtained, should be considered within the scope of protection of the present disclosure.

To describe easily, the relative space technical terms such as "under", "below", "down", "above", "up" are used here to describe the relationship between one element or feature with another element or feature as shown in the figures. It can be understood that when one element or layer is described as "be above", "be connected to", or "be coupled to" another element or layer, it can be formed on directly, connected directly, be coupled directly to another element or layer, or can have another element or layer between them. In contrast, when one element is described as directly "be above" another element or layer, or "be connected to" or "be coupled to" another element or layer, there is not another element or layer between them.

It can be understood that the terms here are only used for describe specific embodiments and are not used to limit the present disclosure. When used here unless the contexts are described specifically, otherwise the singular "one" and "the" also means plural. Further, when used in this specification, the terms: comprise" and/or "include" mean the absence of the described features, entirety, steps, operations, elements and/or assemblies, but not excludes the absence or addition of one or multiple other features, entirety, steps, operations, elements and/or assemblies.

Unless giving another definition, the terms used here (including technical term and scientific terms) have their meanings that the person skilled in the art relating to the present disclosure usually understands. To further understanding, the terms defined in the common dictionary should be understood as their ordinary meanings in their relating field, but are not defined as ideal or over formal meanings unless are so defined specifically.

Figure 1:
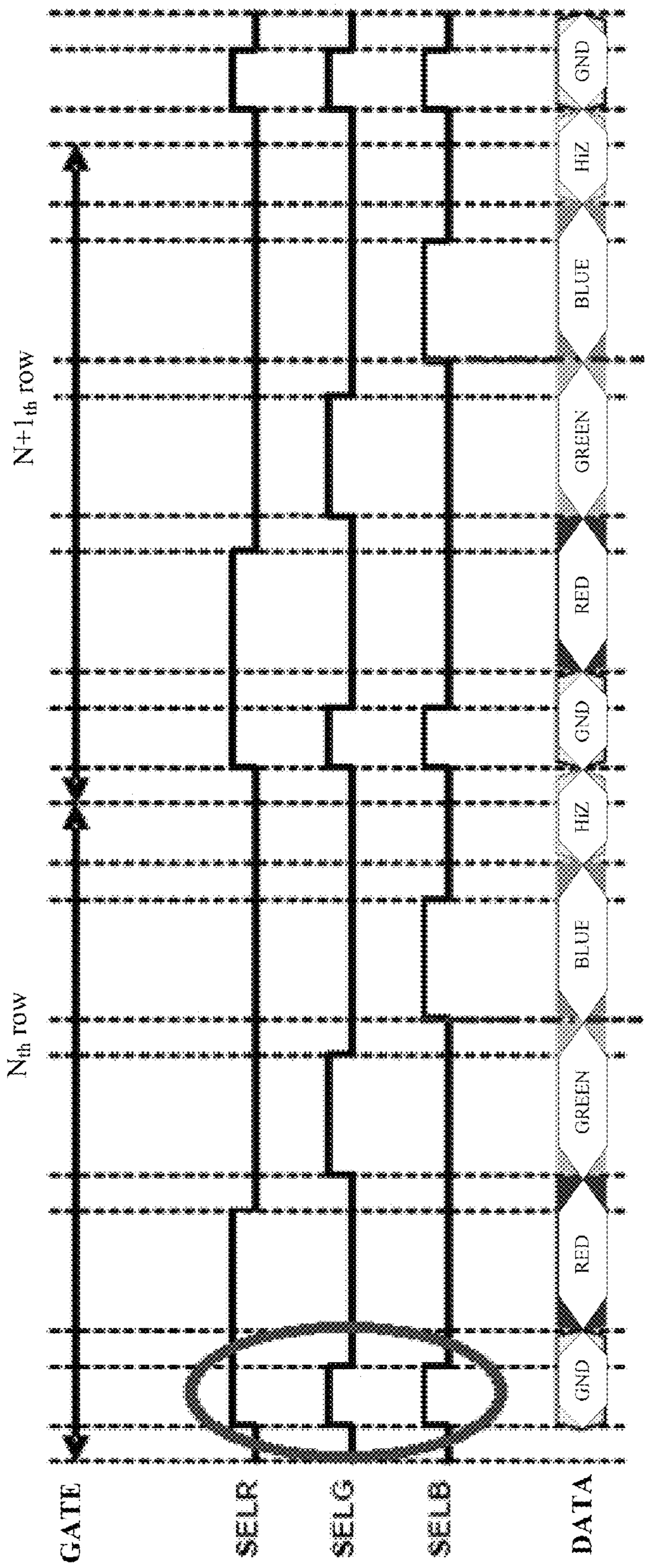
FIG. 1 is a time sequence diagram of the charging gating signals of a conventional LCD device in accordance with the prior art.
Figure 2:
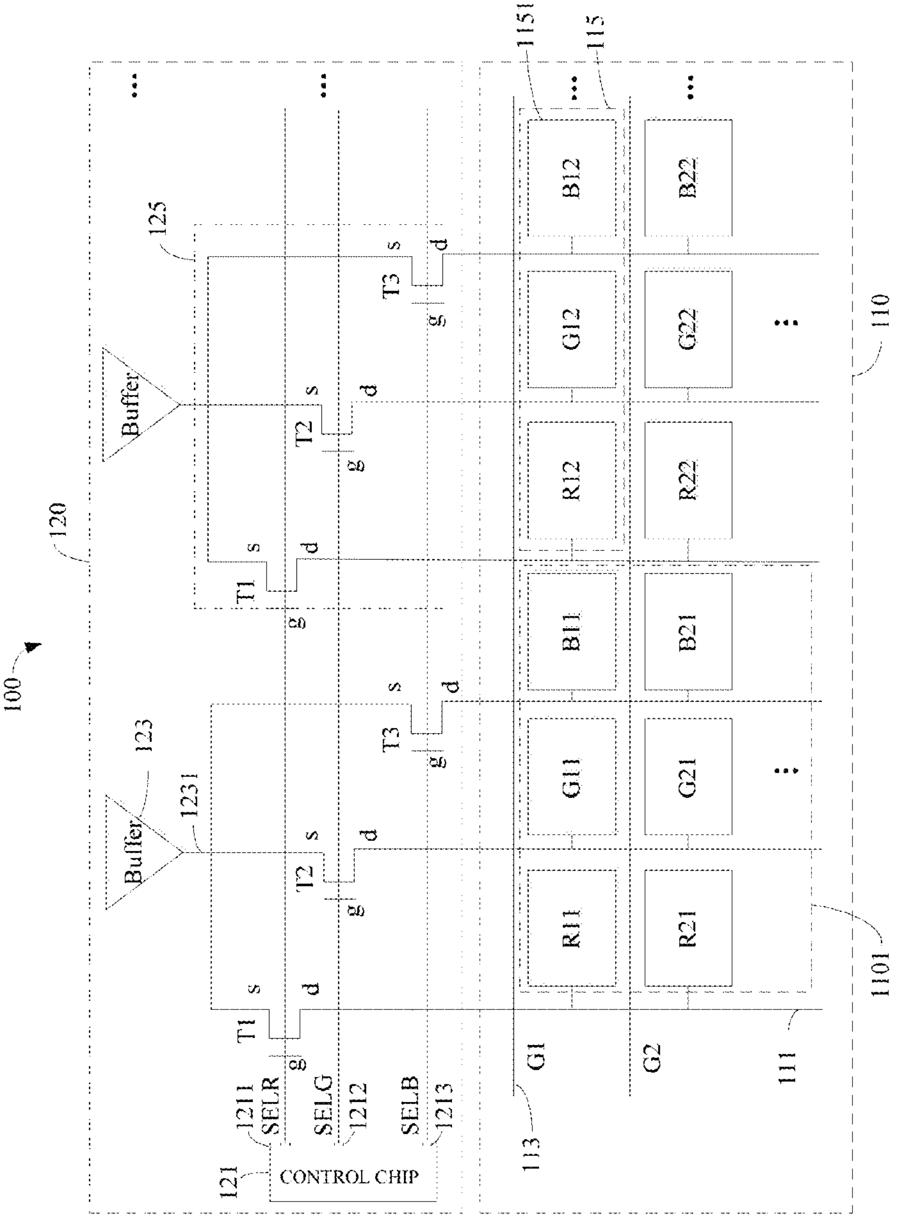
FIG. 2 is an illustrative view of a LCD device in accordance with the present disclosure.

With reference to FIG. 2, a first embodiment of a LCD device 100 in accordance with the present disclosure comprises a LCD panel 110 and a driving circuit 120 to drive the LCD panel. The LCD panel 110 comprises multiple data lines 111, multiple scanning lines 113 and multiple pixel units 115. The data lines 111 are arranged in parallel and in intervals along the vertical direction. The scanning lines 113 are arranged in parallel and in intervals along the horizontal direction. The pixel units 115 are arranged in a matrix, wherein each pixel unit 115 includes three sub-pixel units 1151 respectively representing the trichomatic red, green and blue.

In this embodiment, the three sub-pixel units 1151 of each pixel unit 115 are arranged in parallel and in intervals along the horizontal direction and are respectively marked as a red sub-pixel unit, a green sub-pixel unit and a blue sub-pixel unit. All sub-pixel units 1151 are arranged in a matrix. Each sub-pixel unit 1151 driven by a TFT. Each data line 111 connects respectively to the sub-pixel units 1151 in the same column to transmit the data signal provided by the driving circuit 120 to the sub-pixel units 1151. Each scanning line 113 connects respectively to the sub-pixel units 1151 in the same row to transmit the scanning signal provided by the driving circuit 120 to the sub-pixel units 1151.

In this embodiment, the LCD panel 110 is driven by the method that using a pixel as a unit and column-reversal driving method. Specifically, the LCD panel 110 are divided into multiple pixel columns 1101 by taking the pixel units 115 in the same column an unit. The driving circuit 120 provides source voltages with opposite polarities to the pixel units 115 of any two adjacent pixel columns 1101 through the data lines 111 so that the pixel units 115 of any two adjacent pixel columns 1101 are controlled to perform the pixel voltages with opposite polarities. When the LCD panel 110 switches images, the driving circuit 120 controls the pixel units 115 of any two adjacent pixel columns 1101 to reverse the polarities of the pixel voltages (specifically with reference to FIG. 3).

In FIG. 2, each pixel column 1101 comprises multiple pixel units 115. The pixel units 115 are arranged in a column. Each pixel unit 115 includes a red sub-pixel unit, a green sub-pixel unit and a blue sub-pixel unit. The red sub-pixel unit, the green sub-pixel unit and the blue sub-pixel unit are arranged in a row. A first transistor T1 connecting between a corresponding buffer 123 and the red sub-pixel units in the same column. A second transistor T2 connects between a corresponding buffer 123 and the green sub-pixel units in the same column. A third transistor T3 connects between a corresponding buffer 123 and the blue sub-pixel units in the same column. The source voltage is a driving source voltage of a corresponding TFT provided by the driving unit 120 to drive the sub-pixel unit 1151 so that the corresponding sub-pixel unit 1151 is charged to the corresponding pixel voltage from the source voltage.

Figure 3:
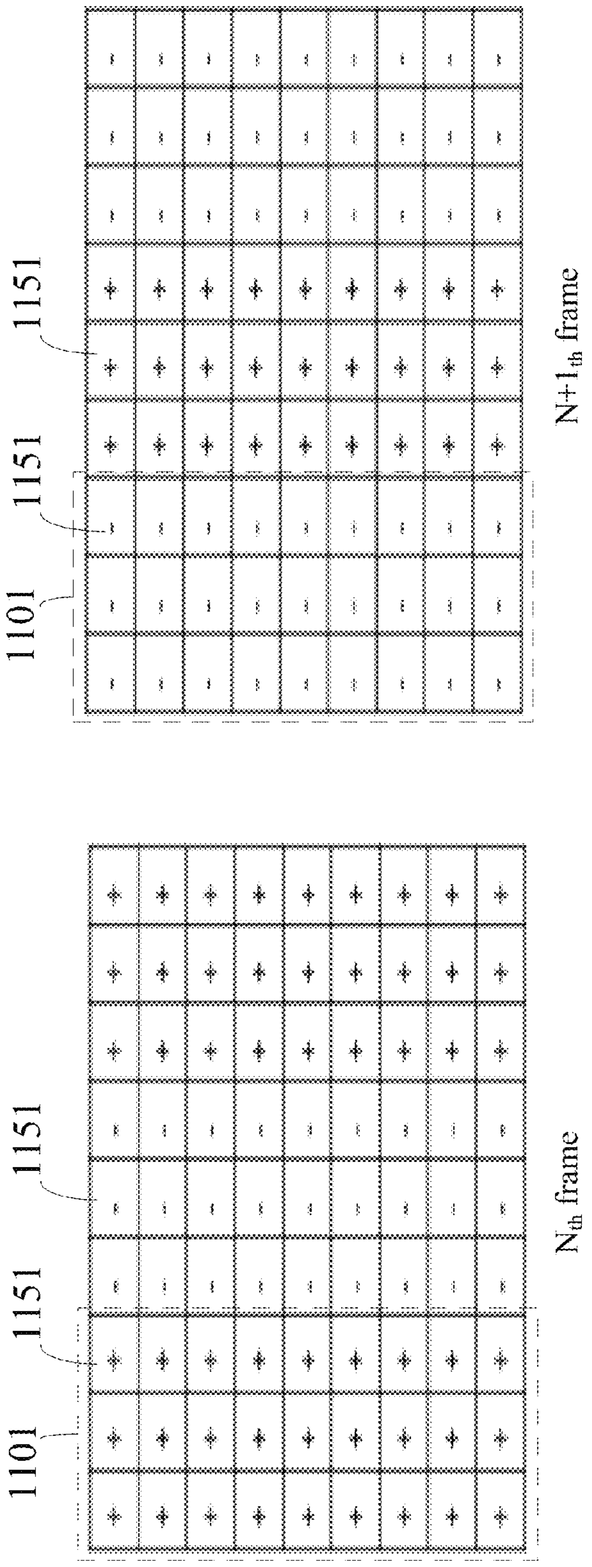
FIG. 3 is an illustrative view of the LCD device in accordance with the present disclosure, shown the polarities of the pixel units reversed.

Specifically, with reference simultaneously to FIGS. 2 and 3, the pixel voltage of the sub-pixel units 1151 in the same pixel column 1101 have the same polarity. The pixel voltage of the sub-pixel units 1151 in adjacent pixel columns 1101 have the opposite polarities. For example, assuming when the Nth frame of image is displayed and the polarities of the electrode voltages of the sub-pixel units 1151 in the pixel columns 1101 shown in FIG. 3 are all "+", i.e. the polarities of the electrode voltages of the sub-pixel units in the pixel columns having sub-pixel units R11, G11, B11, R21, G21, B21 shown in FIG. 2 are all "+", the polarities of the electrode voltages of the sub-pixel units 1151 in the pixel column adjacent to the pixel column 1101 shown in FIG. 3 are all "−", i.e. the polarities of the electrode voltages of the sub-pixel units in the pixel columns having sub-pixel units R12, G12, B12, R22, G22, B22 shown in FIG. 2 are all "−". When switching to N+1th frame of image, and the polarities of the electrode voltages of the sub-pixel units 1151 in the pixel columns 1101 shown in FIG. 3 are reversed to be "−", i.e. the polarities of the electrode voltages of the sub-pixel units in the pixel columns having sub-pixel units R11, G11, B11, R21, G21, B21 shown in FIG. 2 are reversed to be "−", the polarities of the electrode voltages of the sub-pixel units 1151 in the pixel column adjacent to the pixel column 1101 shown in FIG. 3 are reversed to be "+", i.e. the polarities of the electrode voltages of the sub-pixel units in the pixel columns having sub-pixel units R12, G12, B12, R22, G22, B22 shown in FIG. 2 are reversed to be "+".

The driving circuit 120 comprises a control chip 121, multiple buffers 123 and multiple selecting circuits 125. The control chip 121 has a first terminal 1211, a second terminal 1212 and a third terminal 1213. The first terminal 1211 is used to output a first selecting signal SELR. The second terminal 1212 is used to output a second selecting signal SELG. The third terminal 1213 is used to output a third selecting signal SELB. The buffers 123 are used to buffer data signals and pre-charge voltage signals. Each buffer 123 has an output terminal 1231 used to output the data signals and pre-charge voltage signals. Each buffer 123 corresponds to and connects to one of the selecting circuits 125. Each selecting signal 125 corresponds to and connects to one of the pixel columns 1101. Each selecting circuit 125 has a first transistor T1, a second transistor T2 and a third transistor T3. The first transistors T1, the second transistors T2 and the third transistors T3 all have a gate g, a source s and a drain d. The first terminal 1211 is connected to the gate g of each first transistor T1. The second terminal 1212 is connected to the gate g of each second transistor T2. The third terminal 1213 is connected to the gate g of each third transistor T3. The output terminal 1231 of each buffer 123 is connected to the sources s of the first transistor T1, the second transistor T2 and the third transistor T3 of each corresponding selecting circuit 125. The drains d of the first transistor T1, the second transistor T2 and the third transistor T3 of each selecting circuit 125 are connected to the sub-pixel units 1151 in each column of each corresponding pixel column 1101 through one of the data lines 111.

The operation principle of the LCD device 100 is described below:

The first selecting signal SELR, the second selecting signal SELG and the third selecting signal SELB are composed by a first voltage level and a second voltage level. The first transistors T1, the second transistors T2 and the third transistors T3 all have two operation status including turned on and turned off. The control chip 121 controls the first selecting signal SELR, the second selecting signal SELG and the third selecting signal SELB to switch between the first voltage level and the second voltage level according to the operation time sequence control of the LCD device 100 so that to control the first transistors T1, the second transistors T2 and the third transistors T3 to be turned on or turned off. Specifically, when the first selecting signal SELR is on the first voltage level, the first transistor T1 of each selecting circuit 125 is turned on. The data signal buffered in each buffer 123 is transmitted to the red sub-pixel units in one column through the first transistor T1 and the data line 111 connecting to the first transistor T1. When the first selecting signal SELR is on the second voltage level, the first transistor T1 of each selecting circuit 125 is turned off. When the second selecting signal SELG is on the first voltage level, the second transistor T2 of each selecting circuit 125 is turned on. The data signal buffered in each buffer 123 is transmitted to the green sub-pixel units in one column through the second transistor T2 and the data line 111 connecting to the second transistor T2. When the second selecting signal SELG is on the second voltage level, the second transistor T2 of each selecting circuit 125 is turned off. When the third selecting signal SELB is on the first voltage level, the third transistor T3 of each selecting circuit 125 is turned on. The data signal buffered in each buffer 123 is transmitted to the blue sub-pixel units in one column through the third transistor T3 and the data line 111 connecting to the third transistor T3. When the third selecting signal SELB is on the second voltage level, the third transistor T3 of each selecting circuit 125 is turned off.

Figure 4:
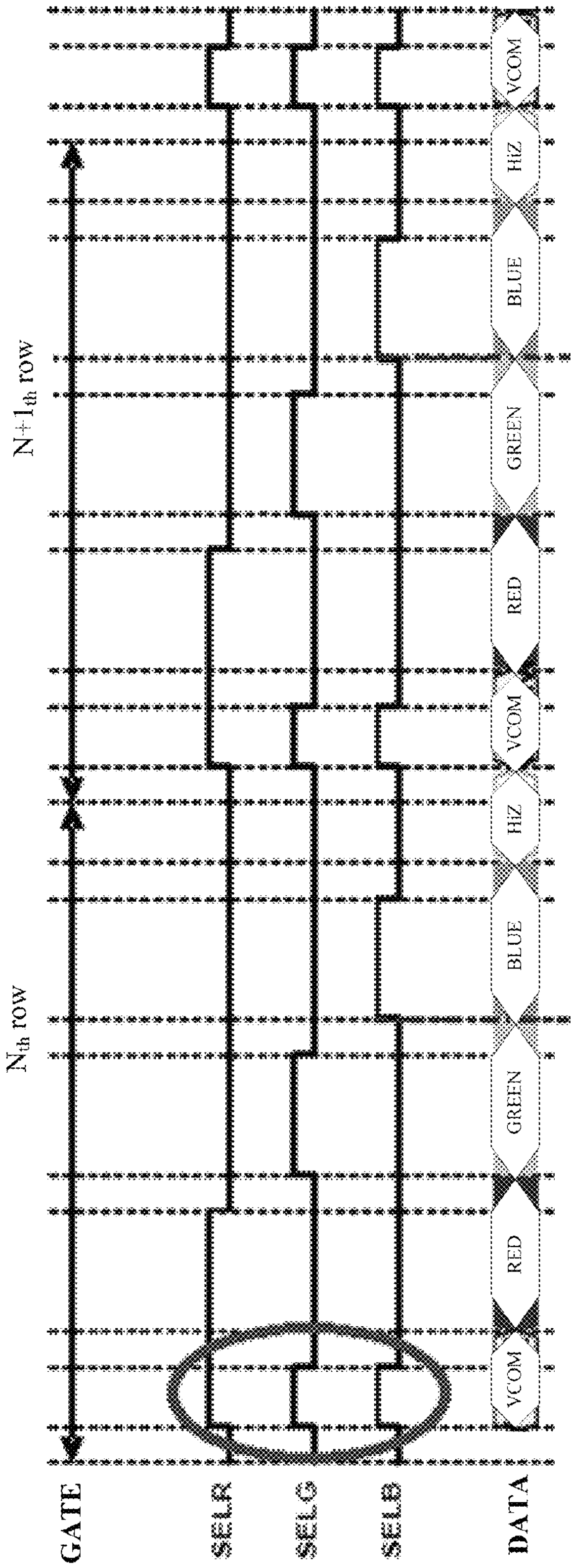
FIG. 4 is a operation time sequence diagram of the LCD device in accordance with the present disclosure.

With reference to FIG. 4, FIG. 4 is a operation time sequence diagram of the LCD device 100 in accordance with the present disclosure. The time sequence diagram includes multiple time sequence periods. Each time sequence period comprises a first time sequence, a second time sequence, a third time sequence, a fourth time sequence and a fifth time sequence. GATE represents the scanning signal on the scanning line 113. SELR, SELG, SELB respectively represent the first selecting signal, the second selecting signal and the third selecting signal provided by the control chip 121. DATA represents the data signal provided by the buffer 123. Each scanning line 113 provides the scanning signal in sequence according to the time sequence. For example, in the first time sequence period, the first row scanning line G1 provides scanning signal to turn on the TFTs of the sub-pixel units 1151 in the first row. In the second time sequence period, the second row scanning line G2 provides scanning signal to turn on the TFTs of the sub-pixel units 1151 in the second row. FIG. 3 is the time sequence diagram showing that GATE provides scanning signal to the scanning line in Nth row and the scanning line in N+1th row. The operation principle of the LCD device 100 in each time sequence in a time sequence period is:

In the first time sequence, the control chip 121 controls the first terminal 1211, the second terminal 1212 and the third terminal 1213 to respectively output the first selecting signal SELR on the first voltage level, the second selecting signal SELG on the first voltage level and the third selecting signal SELB on the first voltage level. The output terminals 1231 of each buffer 123 all output the pre-charge voltage. Since the first transistors T1, the second transistors T2 and the third transistors T3 are turned on, all of the sub-pixel units 1151 are charged to the pre-charge voltage.

Figure 5:
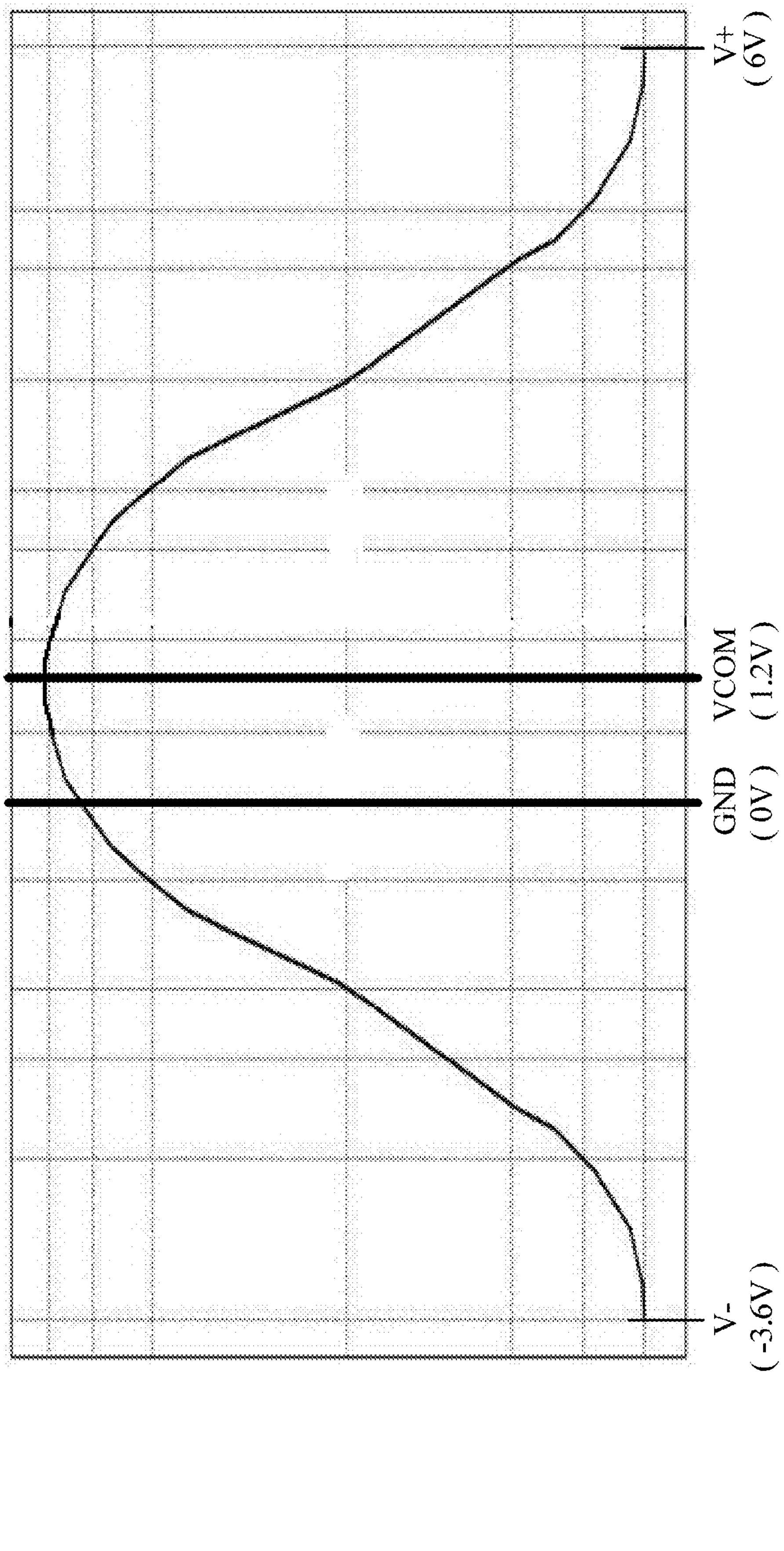
FIG. 5 is a curve diagram of the LCD device in accordance with the present disclosure in gray scale.

With reference to FIG. 5, FIG. 5 shows the voltage curves corresponding to different gray scale brightness of one sub-pixel unit 1151 the LCD device 100 during the polarity-reversion process. The position that V+ indicates corresponds to the positive pixel voltage on highest gray scale brightness. The position that V− indicates corresponds to the negative pixel voltage on highest gray scale brightness. The position that GND indicates corresponds to the ground voltage. The position that VCOM indicates corresponds to the public voltage.

It is shown in FIG. 5 that during the polarity-reversion process of the sub-pixel unit 1151, the public voltage VCOM locates on the symmetrical axis, i.e. that the public voltage VCOM is the average of the positive pixel voltage V+ and the negative pixel voltage V−. Then the GND voltage is not the average of the positive pixel voltage V+ and the negative pixel voltage V−. Therefore, during the polarity-reversion process of the sub-pixel unit 1151, comparing to the technical means that charging the pixel voltage of the sub-pixel unit 1151 to the GND voltage first and charging from GND voltage respectively to the positive pixel voltage V+ or the negative pixel voltage V−, in the embodiment of the present disclosure, the pixel voltage of the sub-pixel unit 1151 is charged to the public voltage VCOM, and then is charged to the positive pixel voltage V+ or the negative pixel voltage V− so that the charging difference of the voltage of the sub-pixel unit 1151 during the polarity-reversion process is effectively decreased to short the charging time and to reduce the power consumption of the LCD device 100. For example, assuming that the public voltage VCOM is 1.2V, the positive and negative pixel voltages V+ and V− for 128 gray scale brightness are respectively 6V and −3.6V. By charging the sub-pixel units 1151 to the public voltage, i.e. 1.2V, the largest difference of voltage of the sub-pixel units 1151 in the adjacent pixel columns 1101 controlled by the driving circuit 120 to reverse the polarity is 4.8V when the LCD device 100 switches frames of images. It reduces 1.2V comparing to charge the sub-pixel units 1151 to GND voltage, i.e. 0V, which cause the largest difference of voltage is 6V. Thus, the power consumption of the LCD device 100 is reduced.

Thus, in this embodiment, the public voltage VCOM is the pre-charge voltage. Worth of note is that the pre-charge voltage value is a median fluctuation value of the positive pixel voltage value and the negative pixel voltage value of the sub-pixel unit 1511 corresponding to the same gray scale brightness, also called average value. The pre-charge voltage is usually not 0V, which is different with the GND voltage. Therefore, in the first time sequence, each buffer 123 outputs a pre-charge signal to charge each sub-pixel unit 1151 to the pre-charge value. For example, the pre-charge voltage value may be set as any voltage value in the predetermined fluctuation range that takes the average value of the positive pixel voltage value V+ and the negative pixel voltage value V− of the sub-pixel unit 1511 corresponding to the highest gray scale brightness as a central value. For example, when the predetermined fluctuation range is 20%, the pre-charge voltage may be set as any voltage value in the range of the average value of the positive pixel voltage value V+ and the negative pixel voltage value V− of the sub-pixel unit 1511 corresponding to the highest gray scale brightness plus (1±20%). It can be understood that the pre-charge voltage is not limited to any voltage value in the predetermined fluctuation range that takes the average value of the positive pixel voltage value V+ and the negative pixel voltage value V− of the sub-pixel unit 1511 corresponding to the highest gray scale brightness as a central value, also may be any voltage value in the predetermined fluctuation range that takes the average value of the positive pixel voltage value V+ and the negative pixel voltage value V− of the sub-pixel unit 1511 corresponding to the other gray scale brightness as a central value.

In this embodiment, the pre-charge voltage is preferred as the average value of the positive pixel voltage V+ and the negative pixel voltage V− of the sub-pixel unit 1511 corresponding to the highest gray scale brightness, i.e. the public voltage VCOM.

In the second time sequence, the control chip 121 controls the first terminal 1211 to output the first selecting signal SELR on the first voltage level, and controls the second terminal 1212 and the third terminal 1213 to respectively output the second selecting signal SELG on the second voltage level and the third selecting signal SELB on the second voltage level. The output terminals 1231 of each buffer 123 all output the data signal RED for driving the red sub-pixel units. Since the first transistors T1 are turned on and the second transistors T2 and the third transistors T3 are turned off, the data signal RED is only transmitted to the red sub-pixel units in one column to charge the red sub-pixel units from the pre-charge voltage to the corresponding pixel voltage.

In the third time sequence, the control chip 121 controls the first terminal 1211 to output the first selecting signal SELR on the second voltage level, and controls the second terminal 1212 to output the second selecting signal SELG on the first voltage level and the third terminal 1213 to output the third selecting signal SELB on the second voltage level. The output terminals 1231 of each buffer 123 all output the data signal GREEN for driving the green sub-pixel units. Since the second transistors T2 are turned on and the first transistors T1 and the third transistors T3 are turned off, the data signal GREEN is only transmitted to the green sub-pixel units in one column to charge the green sub-pixel units from the pre-charge voltage to the corresponding pixel voltage.

In the fourth time sequence, the control chip 121 controls the first terminal 1211 and the second terminal 1212 to respectively output the first selecting signal SELR on the second voltage level and the second selecting signal SELG on the second voltage level and the third terminal 1213 to output the third selecting signal SELB on the first voltage level. The output terminals 1231 of each buffer 123 all output the data signal BLUE for driving the blue sub-pixel units. Since the first transistors T1 and the second transistors T2 are turned off and the third transistors T3 are turned on, the data signal BLUE is only transmitted to the blue sub-pixel units in one column to charge the blue sub-pixel units from the pre-charge voltage to the corresponding pixel voltage.

In the fifth time sequence, the control chip 121 controls the first terminal 1211, the second terminal 1212 and the third terminal 1213 to respectively output the first selecting signal SELR on the second voltage level, the second selecting signal SELG on the second voltage level and the third selecting signal SELB on the second voltage level. The first transistors T1, the second transistors T2 and the third transistors T3 so that the output terminals 1231 of each buffer 123 perform as high-resistance HiZ status.

It can be understood that during the process to scan the pixel units in the Nth row, the scanning line 113 in the Nth row provides the scanning signal GATE to turn on the TFT of all of the sub-pixel units 1151 in the Nth row so that the scanning process to the pixel units in the Nth row through the aforementioned first to fifth time sequences is finished. When finishing scanning the pixel units in the Nth row, the scanning line 113 in the Nth row stops providing scanning signal, and the scanning line 113 in the N+1th row start providing scanning signal to turn on the TFT of all of the sub-pixel units 1151 in the N+1th row and then the scanning process to the pixel units in the N+1th row through the aforementioned first to fifth time sequences is repeated.

Figure 6:
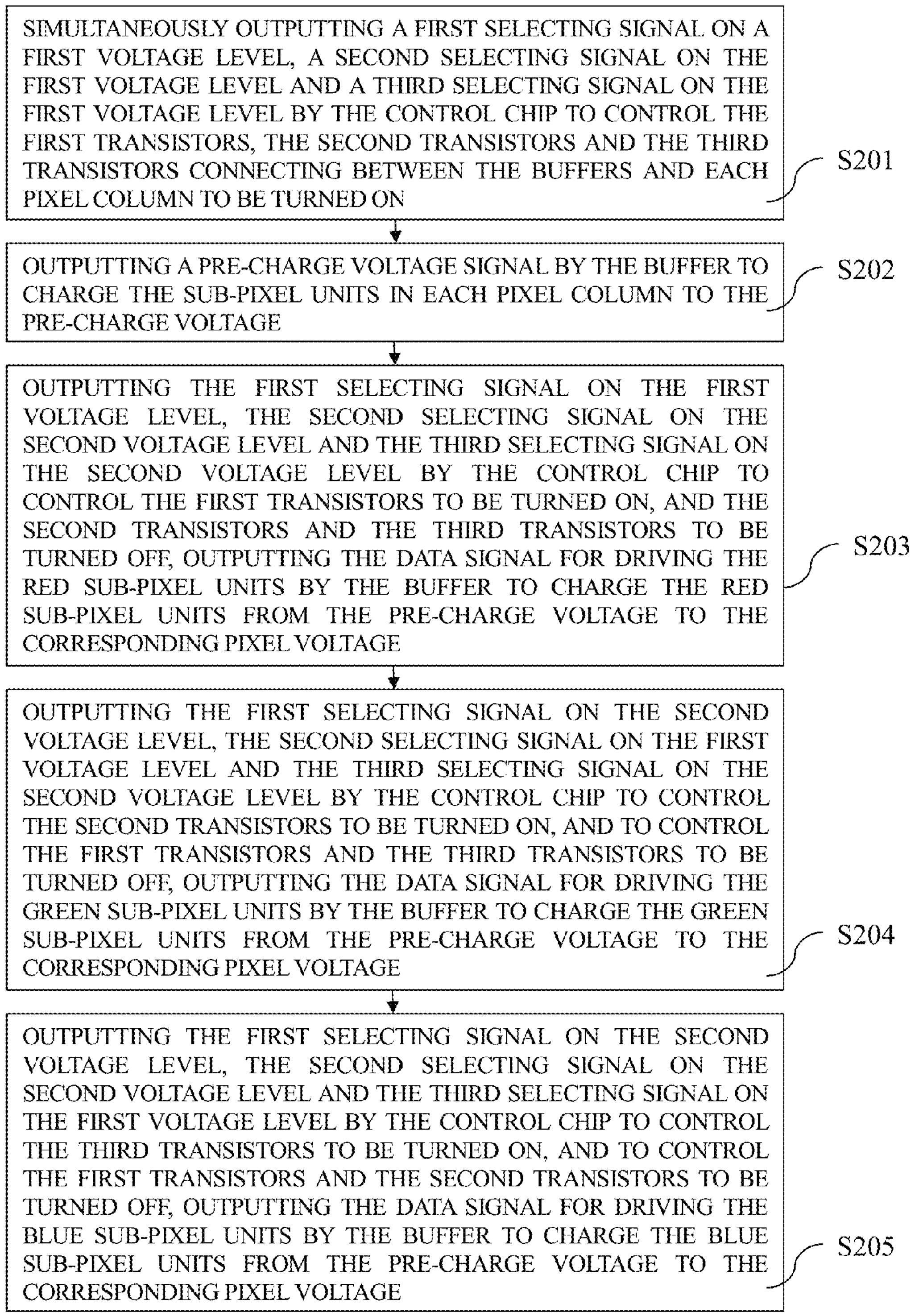
FIG. 6 is a flow chart of a driving method of the LCD device in accordance with the present disclosure.

With reference to FIG. 6, the second embodiment in accordance with the present disclosure provides a driving method for a LCD panel. The method is applied to the LCD device 100 shown in the embodiment in FIG. 2 and at least comprises following steps:

Step S201: The control chip 121 simultaneously outputs a first selecting signal SELR on a first voltage level, a second selecting signal SELG on the first voltage level and a third selecting signal SELB on the first voltage level to control the first transistors T1, the second transistors T2 and the third transistors T3 connecting between the buffers 123 and each pixel column 1101 to be turned on.

Each pixel column 1101 comprises multiple pixel units 115. The pixel units 115 are arranged in a column. Each pixel unit 115 includes a red sub-pixel unit, a green sub-pixel unit and a blue sub-pixel unit. The red sub-pixel unit, the green sub-pixel unit and the blue sub-pixel unit are arranged in a row. The first transistor T1 connecting between a corresponding buffer 123 and the red sub-pixel units in the same column. A second transistor T2 connects between a corresponding buffer 123 and the green sub-pixel units in the same column. A third transistor T3 connects between a corresponding buffer 123 and the blue sub-pixel units in the same column.

Step S202: The buffers 123 output a pre-charge voltage signal to pre-charge the sub-pixel units 1151 in each pixel column 1101 to the pre-charge voltage. The pre-charge voltage is any voltage value in the predetermined fluctuation range that takes the average value of the positive pixel voltage value V+ and the negative pixel voltage value V− of the sub-pixel unit 1511 corresponding to the same gray scale brightness as a central value.

Step S203: The control chip 121 outputs the first selecting signal SELR on the first voltage level, the second selecting signal SELG on the second voltage level and the third selecting signal SELB on the second voltage level to control the first transistors T1 to be turned on, and to control the second transistors T2 and the third transistors T3 to be turned off. The buffers 121 output the data signal RED for driving the red sub-pixel units to charge the red sub-pixel units from the pre-charge voltage to the corresponding pixel voltage.

Step S204: The control chip 121 outputs the first selecting signal SELR on the second voltage level, the second selecting signal SELG on the first voltage level and the third selecting signal SELB on the second voltage level to control the second transistors T2 to be turned on, and to control the first transistors T1 and the third transistors T3 to be turned off. The buffers 121 output the data signal GREEN for driving the green sub-pixel units to charge the green sub-pixel units from the pre-charge voltage to the corresponding pixel voltage.

Step S205: The control chip 121 outputs the first selecting signal SELR on the second voltage level, the second selecting signal SELG on the second voltage level and the third selecting signal SELB on the first voltage level to control the third transistors T3 to be turned on, and to control the first transistors T1 and the second transistors T2 to be turned off. The buffers 121 output the data signal BLUE for driving the blue sub-pixel units to charge the blue sub-pixel units from the pre-charge voltage to the corresponding pixel voltage.

In this embodiment, the pre-charge voltage is preferred as the average value of the positive pixel voltage V+ and the negative pixel voltage V− of the sub-pixel unit 1511 corresponding to the highest gray scale brightness, i.e. the public voltage VCOM.

It can be understood that each aforementioned step of the this embodiment of the driving method for the LCD panel may be implemented as the description of the embodiments of the device shown in FIGS. 2 to 5, which is not described more here.

The present disclosure recites the driving method for the LCD device 100 and the LCD panel. First, in the charging phase before writing data into each pixel unit through the data lines, the first transistors T1, the second transistors T2 and the third transistors T3 are simultaneously controlled to be turned on by the control chip 121 to charge all of the sub-pixel units 1151 to the public voltage VCOM. Thus, when the LCD panel 110 switches the frame of images, the largest difference of voltage of the pixel units 115 in the adjacent pixel columns 1101 during the polarity-reversion is decreased to reduce the charging time for the sub-pixel units 1151 when the LCD panel 110 switches the frame of images. Thus, the power consumption of the LCD device 100 is reduced.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A driving method for a liquid crystal display (LCD) panel, wherein the method comprises steps of:

simultaneously outputting a first selecting signal on a first voltage level, a second selecting signal on the first voltage level and a third selecting signal on the first voltage level by a control chip to control first transistors, second transistors and third transistors connecting between buffers and each pixel column to be turned on;

outputting a pre-charge voltage signal to pre-charge sub-pixel units in each pixel column to the pre-charge voltage by the buffers, wherein the pre-charge voltage is an average value of a positive pixel voltage value and a negative pixel voltage value of the sub-pixel units corresponding to the same gray scale brightness, wherein the pre-charge voltage is lower than the positive pixel voltage value or is higher than the negative pixel voltage value.

2. The driving method for an LCD panel according to claim 1, wherein the same gray scale brightness is a highest gray scale brightness.

3. The driving method for an LCD panel according to claim 1, wherein when the sub-pixel units in each pixel column are all charged to the pre-charge voltage, the method further comprises steps of:

outputting the first selecting signal on the first voltage level, the second selecting signal on a second voltage level and the third selecting signal on the second voltage level by the control chip to control the first transistors to be turned on, and to control the second transistors and the third transistors to be turned off, and outputting a data signal for driving red sub-pixel units by the buffers to charge the red sub-pixel units from the pre-charge voltage to a corresponding pixel voltage.

4. The driving method for an LCD panel according to claim 3, wherein when the red sub-pixel units are charged to the corresponding pixel voltage, the method further comprises steps of:

outputting the first selecting signal on the second voltage level, the second selecting signal on the first voltage level and the third selecting signal on the second voltage level by the control chip to control the second transistors to be turned on, and to control the first transistors and the third transistors to be turned off, and outputting a data signal for driving green sub-pixel units by the buffers to charge the green sub-pixel units from the pre-charge voltage to a corresponding pixel voltage.

5. The driving method for an LCD panel according to claim 4, wherein when the green sub-pixel units are charged to the corresponding pixel voltage, the method further comprises steps of:

outputting the first selecting signal on the second voltage level, the second selecting signal on the second voltage level and the third selecting signal on the first voltage level by the control chip to control the third transistors to be turned on, and to control the first transistors and the second transistors to be turned off, and outputting a data signal for driving blue sub-pixel units by the buffers to charge the blue sub-pixel units from the pre-charge voltage to a corresponding pixel voltage.

6. An LCD device, wherein the LCD device comprises an LCD panel and a driving circuit for driving the LCD panel; the LCD device comprises multiple pixel columns; each pixel column comprises multiple sub-pixel units; the driving circuit comprises a control chip, multiple buffers and multiple selecting circuits; the control chip is used to output a first selecting signal, a second selecting signal and a third selecting signal; the buffers are used to output a pre-charge voltage signal; each selecting circuit has a first transistor, a second transistor and a third transistor; each buffer connects to the sub-pixel units in the pixel column through the first transistor, the second transistor and the third transistor; the control chip controls the first transistors, the second transistors and the third transistors to be turned on by the first selecting signal, the second selecting signal and the third selecting signal to charge all of the sub-pixel units in each pixel column to a pre-charge voltage by the pre-charge signal outputted by the buffers, wherein the pre-charge voltage is an average value of a positive pixel voltage value and a negative pixel voltage value of the sub-pixel units corresponding to the same gray scale brightness, wherein the pre-charge voltage is lower than the positive pixel voltage value or is higher than the negative pixel voltage value.

7. The LCD device according to claim 6, wherein the gray scale brightness is a highest gray scale brightness.

8. The LCD device according to claim 6, wherein each pixel column comprises multiple pixel units arranged in a column; each pixel unit comprises a red sub-pixel unit, a green sub-pixel unit and a blue sub-pixel unit; the red sub-pixel unit, the green sub-pixel unit and the blue sub-pixel unit are arranged in a row; the first transistor connecting between a corresponding buffer and the red sub-pixel units in one column; the second transistor connects between a corresponding buffer and the green sub-pixel units in one column; the third transistor connects between a corresponding buffer and the blue sub-pixel units in one column.

9. The LCD device according to claim 8, wherein the control chip has a first terminal, a second terminal and a third terminal; the first terminal is used to output the first selecting signal; the second terminal is used to output the second selecting signal; the third terminal is used to output the third selecting signal; each transistor has a gate, a source and a drain; the first terminal is connected to the gate of each first transistor; the second terminal is connected to the gate of each second transistor; the third terminal is connected to the gate of each third transistor.

10. The LCD device according to claim 9, wherein the buffers are also used to buffer data signals; each buffer has an output terminal; the output terminal of each buffer is connected to the sources of the first transistor, the second transistor and the third transistor of each corresponding selecting circuit; the drains of the first transistor, the second transistor and the third transistor of each selecting circuit are connected to the sub-pixel units in each column of each corresponding pixel column.

11. The LCD device according to claim 10, wherein the first selecting signal, the second selecting signal and the third selecting signal are composed by a first voltage level and a second voltage level; when the first selecting signal is on the first voltage level, the second selecting signal and the third selecting signal are on the second voltage level, the first transistors are turned on and the second transistors and the third transistors are turned off; the data signal buffering in the buffers is transmitted to the red sub-pixel units in one column through the first transistors to charge the red sub-pixel units from the pre-charge voltage to a corresponding pixel voltage.

12. The LCD device according to claim 11, wherein when the second selecting signal is on the first voltage level, the first selecting signal and the third selecting signal are on the second voltage level, the second transistors are turned on and the first transistors and the third transistors are turned off; the data signal buffering in the buffers is transmitted to the green sub-pixel units in one column through the second transistors to charge the green sub-pixel units from the pre-charge voltage to a corresponding pixel voltage.

13. The LCD device according to claim 11, wherein when the third selecting signal is on the first voltage level, the first selecting signal and the second selecting signal are on the second voltage level, the third transistors are turned on and the first transistors and the second transistors are turned off; the data signal buffering in the buffers is transmitted to the blue sub-pixel units in one column through the third transistors to charge the blue sub-pixel units from the pre-charge voltage to a corresponding pixel voltage.

* * * * *